June 9, 1953 P. E. KOPP 2,641,042
CUTTING MACHINE FOR EXTRUDED CLAY PRODUCTS
Filed Sept. 28, 1950 2 Sheets-Sheet 1
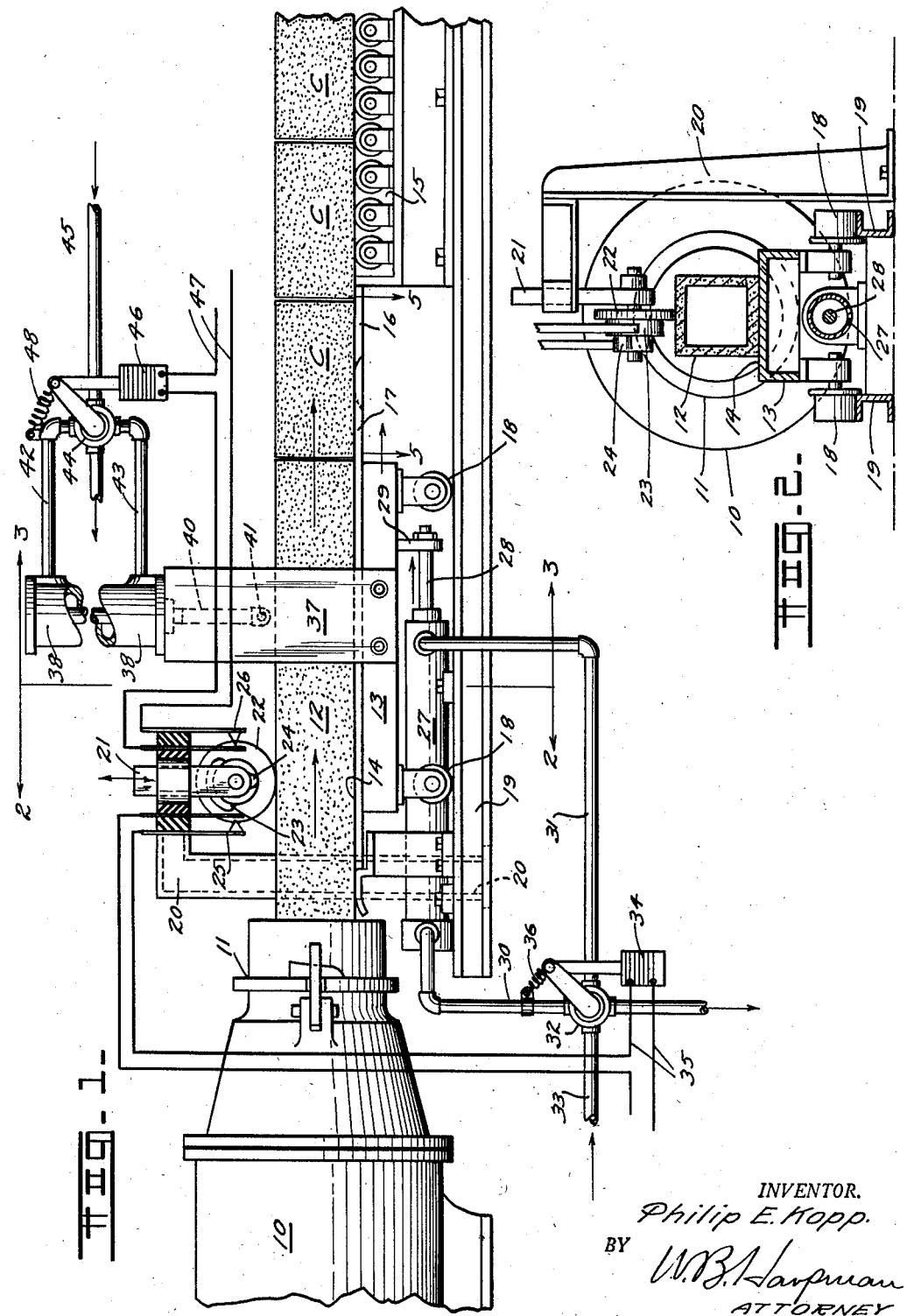
INVENTOR.
Philip E. Kopp.
BY
W. B. Harpman
ATTORNEY June 9, 1953      P. E. KOPP      2,641,042
CUTTING MACHINE FOR EXTRUDED CLAY PRODUCTS
Filed Sept. 28, 1950      2 Sheets-Sheet 2
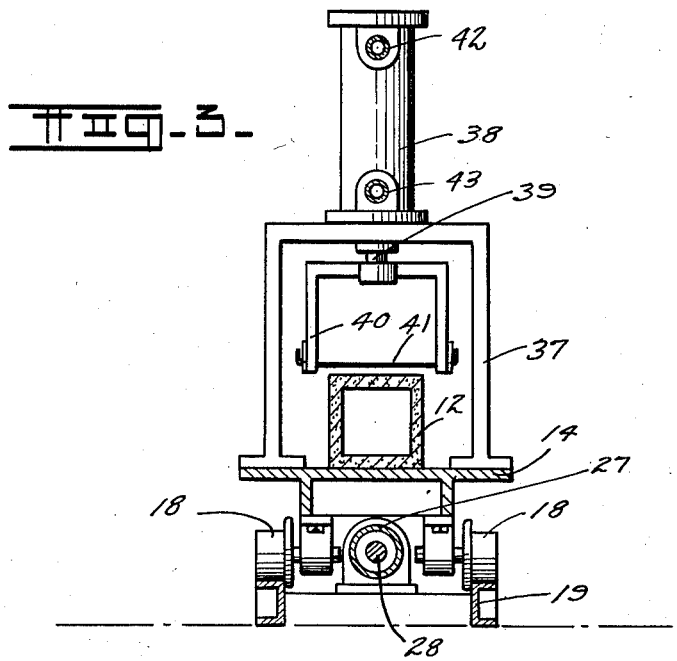
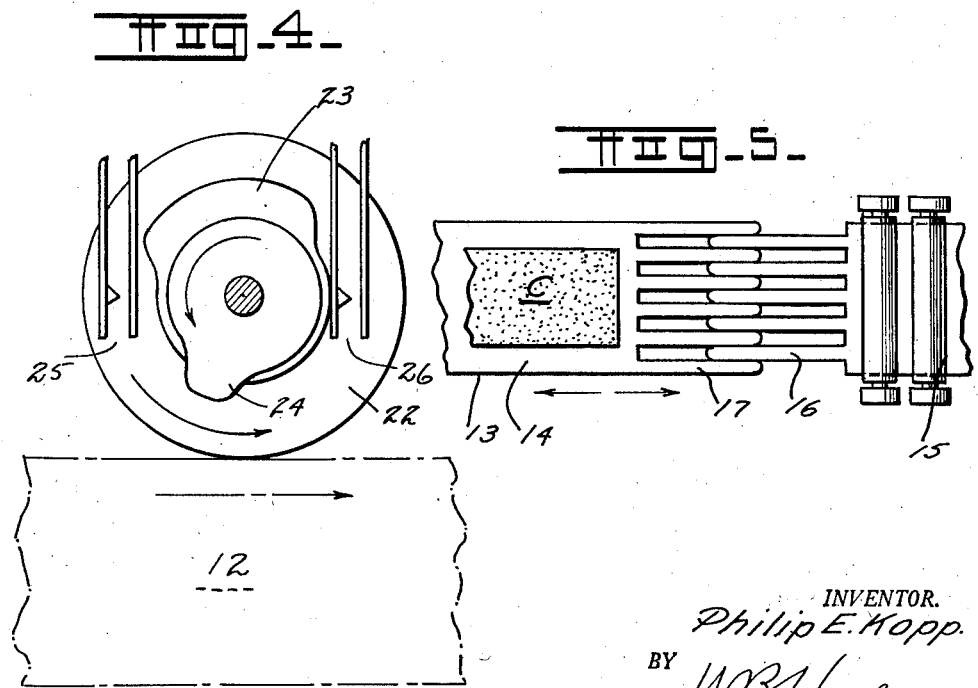
INVENTOR.
Philip E. Kopp.
BY
W. B. Harpman
ATTORNEY.

Patented June 9, 1953

2,641,042

UNITED STATES PATENT OFFICE 2,641,042

CUTTING MACHINE FOR EXTRUDED CLAY PRODUCTS

Philip E. Kopp, Youngstown, Ohio

Application September 28, 1950, Serial No. 187,229

1 Claim. (Cl. 25—107)

This invention relates to extruded clay products in general and more particularly to a cutting machine to automatically cut a continuous column of an extruded clay product at desired intervals. It is known in the art of tile forming and the like that it is customary to extrude a desired cross sectional shape of a semi-solid clay and to cut the extruded shape into desired lengths prior to baking the clay products thus formed. In the formation of flue tile and similar clay products it is particularly advantageous to employ an automatic machine for determining the desired length of the section of the extruded clay to be cut, provide suitable support for the extrusion and the piece to be cut and cut the same cleanly while properly supported and without interrupting the continued extrusion of the clay product.

The principal object of the invention is, therefore, a machine for cutting an extruded clay product simply and efficiently.

A further object of the invention is the provision of a machine for cutting an extruded clay product and simultaneously supporting and moving the same.

A still further object of the invention is the provision of a cutting machine for an extruded clay product which incorporates control means directly engaging the extruded clay section so as to enable an accurate and desired length of the product to be cut.

A still further object of the invention is the provision of a machine for cutting an extruded clay product which is automatic in operation, relatively trouble free and capable of operating continuously without attention, adjustment or other interruption.

The machine for cutting extruded clay products disclosed herein meets the several objects of the invention in that it provides for the continuous reception of an extruded column of material, for example, clay in a desired cross sectional shape, for example, that of flue tile, the device acting as a conveyor table receiver and supporting the clay column and including means directly engaging the clay column and actuated thereby for determining when a desired length of the clay column has been extruded and simultaneously actuating other means in the machine for moving the support element of the machine along with the clay column and simultaneously cutting the clay column, the entire mechanism being so arranged that it automatically recycles repeatedly subject to the extruded clay column itself.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation with parts broken away and parts in cross section illustrating the cutting machine for extruded clay products.

Figure 2 is a vertical section on line 2—2 of Figure 1 illustrating the controlling means engaging the extruded clay column.

Figure 3 is a vertical section on line 3—3 of Figure 1 illustrating the vertically acting cut-off means.

Figure 4 is an enlarged detail of the controlling means shown in Figures 1 and 2.

Figure 5 is a horizontal section on line 5—5 of Figure 1.

By referring to Figure 1 in particular it will be seen that the discharge end of an extrusion press 10 is disclosed, the actual extrusion die and delivery end of the press being generally indicated by the numeral 11. An extruded column of material 12, such as clay, is shown emerging continuously from the press 10 and being received by a reciprocally positioned supporting table 13, the top surface 14 of which is smooth and flat so that the column of material 12 normally slides longitudinally thereacross.

A conveyor assembly 15 has extended portions 16 slidably engaging extending portions 17 on the table 13 so that a continuously supporting surface is provided for the extruded column of material 12. The supporting table 13 is mounted on supporting wheels 18—18 which in turn are positioned on a pair of spaced longitudinally extended rails 19—19.

In Figure 1 of the drawings the extruded clay column emerges from the press 10 and moves continuously over the top surface 14 of the supporting table 13, the extensions 17 and 16 on the table and the conveyor, respectively, and subsequently over the conveyor 15. A stand 20 is positioned adjacent the table 13 and extends vertically along side the same and horizontally over the same and carries a vertically movable arm 21 which has a wheel 22 journaled on its lower end and which wheel 22 is adapted to engage the upper surface of the extruded column of material 12 and be revolved thereby.

The wheel 22 carries a pair of horizontally spaced cam discs 23 and 24 as best illustrated in Figure 4 of the drawings and a pair of electrical switches 25 and 26 are positioned adjacent the cam discs 23 and 24 and arranged so that the switch 25 is adapted to be closed by the cam disc 23 and the switch 26 is adapted to be closed by the cam disc 24. The switches 25 and 26 are normally open and it will thus be seen that as the extruded column of material 12 moves across the table 13 the wheel 22 will be revolved thereby and the switches 25 and 26 closed and opened by the cam discs 23 and 24, respectively.

By referring now to Figures 1 and 2 of the drawings it will be seen that a hydraulic piston and cylinder assembly 27 is positioned beneath the table 13 with the piston rod 28 of the assembly connected to a depending portion 29 of the table 13 so that at such time as compressed air or the like is delivered to the hydraulic piston and cylinder assembly 27, it will move the table 13 along the rails 19. Piping connections 30 and 31 extend from the opposite ends of the cylinder assembly 27 to a four way valve 32 which is in communication with a source 33 of compressed air and which is automatically actuated by a solenoid 34. An electric circuit 35 energizes the solenoid 34 and is controlled by the switch 25 heretofore referred to.

The four way valve 32 is normally biased to position shown in Figure 1 of the drawings by a spring 36 and the solenoid 34 is normally de-energized. In such position the valve 32 establishes communication between the compressed air source 33 and the connection 31 and thereby holds the table in retracted position adjacent the discharge orifice 11 of the extrusion press 10. At such time as the switch 25 is closed by rotation of the wheel 22 on the extruded column of material 12 the valve 32 is reversed by the action of the solenoid 34 which is then energized so that the compressed air source 33 is placed in communication with the piping connection 30 and the hydraulic piston and cylinder assembly then permits the table 13 to move away from the press 10 with the extruded column of material 12 which it continues to support.

The table 13 has an inverted U-shaped frame 37 positioned thereon and extending thereabove which supports on its uppermost end a secondary piston and cylinder assembly 38, the piston rod of which extends downwardly into the area between the arms of the U-shaped frame 37 and carries a yoke 40 which in turn supports a cutting wire 41 immediately above the extruded column of material 12. Piping 42 and 43 connects with the opposite ends of the cylinder 38 and a secondary four way valve 44 which is supplied with compressed air from a source 45. A secondary solenoid 46 is electrically connected in a circuit 47 which includes the switch 26 heretofore referred to and is normally biased to the position illustrated by a spring 48 and whereby the compressed air source 45 is in communication with the piping 43 whereby the yoke 40 and the cutting wire 41 are held in elevated relation to the extruded column of material 12.

The switch 26 is responsive in closing to the cam disc 24 which is affixed to the wheel 22 as heretofore described and spaced radially with respect to the cam disc 23 so that the switch 26 is closed briefly after the switch 25 has been closed by the cam disc 23.

Those skilled in the art will recognize that the closing of the cam disc 23 will have initiated movement of the table 13 as heretofore described and it will, therefore, be moving with the extruded column of material 12. Such motion of the table 13 will also be imparted with the frame 37, the cylinder 38 and the yoke 40 and cutting wire 41 and the same will therefore be moved along with the extruded column of material 12 with no relative motion therebetween so that the closing of the switch 26 will energize the solenoid 46, move the valve 44 to connect the compressed air source 45 with the line 42 and thereby move the yoke 40 and cutting wire 41 downwardly through the extruded column of material 12 at a predetermined point.

By referring to Figure 3 of the drawings it will be seen that this action results in moving the cutting wire 41 completely through the extruded column of material 12 and by referring to Figure 4 of the drawings it will be seen that the cam 24 is relatively short so that immediately upon the downward motion of the cutting wire having been completed the switch 26 is opened and the solenoid 46 de-energized and the valve 44 returned to normal position whereby the compressed air source 45 is again placed in communication with the line 43, thus retracting the cutting wire 41.

Shortly thereafter the cam 23 moves out of engagement with the switch 25 which opens the circuit 35 and de-energizes the circuit 34. The valve 32 returns to normal position and the air source 33 is placed in communication with the piping connection 31 and the table 13 is moved back to normal position adjacent the press 10. The device has now completed the cycle and is ready for recycling upon the subsequent rotation of the wheel 22 on the extruded column of material 12.

It will be observed that the cut sections of the extruded column of material 12 are indicated by the letter C and they are moved progressively away from the machine and onto the conveyor 15 by the continuous extruding action of the press 10. The engaging extensions 16 and 17 provide support during the motion of the table 13 and it will be observed that other mechanical devices comprising equivalent structures can be used as desired. The engaging extensions 16 and 17 are illustrated in top plan view in Figure 5 of the drawings.

It will be observed to those skilled in the art that the yoke 40 holding the cutting wire 41 may be positioned in suitably formed vertical guides on the U-shaped frame 37 to position the yoke 40 and cutting wire 41 against diagonal movement with respect to the column of material 12. It will also be observed that the pipe 30 may be disconnected and a restricted orifice provided on the piston and cylinder assembly 27 in place thereof as the table 13 moves with the column of material 12 and under ordinary conditions does not need additional movement. Under such modification the restricted orifice causes the piston and cylinder assembly 27 to be cushioned in its returned action when it moves toward the press 10.

It will thus be seen that the several objects of the invention are met by the apparatus disclosed herein.

Having thus described my invention, what I claim is:

In a machine for cutting continuously moving semi-solid hollow extruded material, a table having a smooth top forming a support for the said extruded material, the said material normally sliding over the said table, a piston and cylinder assembly, the piston of which is affixed to said table, a source of fluid pressure in communication with the opposite ends of said cylinder, a solenoid actuated four way valve controlling said fluid pressure and directing same alternately to the opposite ends of said cylinder, a wheel arranged to be rotated by the said continuously moving extruded material, a cam on said wheel and switch means responsive in closing to said cam, an electrical circuit for energizing said solenoid valve and responsive in closing to said switch means whereby predetermined movement of the said extruded material and said wheel initiates movement of the table therebeneath and causes it to move with said material, a cutting mechanism including a cutting wire positioned for vertical reciprocating motion carried by said table, a secondary cam on said wheel and secondary switch means responsive in closing to said secondary cam, the said cutting mechanism responsive in operation to said secondary switch means whereby the material is cut during its continuous movement.

PHILIP E. KOPP.

References Cited in the file of this patent

UNITED STATES PATENTS

| Number | Name | Date |
| --- | --- | --- |
| 2,058,663 | Brown | Oct. 27, 1936 |
| 2,177,607 | Brown et al. | Oct. 24, 1939 |
| 2,377,668 | Bole et al. | June 5, 1945 |